United States Patent [19]

Reinecke et al.

[11] 4,161,341

[45] Jul. 17, 1979

[54] ACTUATING DEVICE FOR PRESSURE MEDIUM BRAKE SYSTEMS

[75] Inventors: Erich Reinecke, Beinhorn; Helmut Ulrich, Springe; Arnold Haas, Sehnde; Willi Kolmitz, Coppenbrugge, all of Fed. Rep. of Germany

[73] Assignee: WABCO Westinghouse GmbH, Hannover, Fed. Rep. of Germany

[21] Appl. No.: 833,800

[22] Filed: Sep. 16, 1977

[30] Foreign Application Priority Data

Sep. 18, 1976 [DE] Fed. Rep. of Germany ........ 2642041

[51] Int. Cl.² .............................................. B60T 15/06
[52] U.S. Cl. ........................................ 303/52; 74/478; 74/512
[58] Field of Search ................ 303/50, 52, 13, 15, 303/3, 20; 200/61.89; 74/478, 512

[56] References Cited

U.S. PATENT DOCUMENTS

| 3,003,825 | 10/1961 | Kemble | 303/52 |
|---|---|---|---|
| 3,790,229 | 2/1974 | Brown | 303/52 |
| 3,838,888 | 10/1974 | Gynn | 303/3 |
| 4,002,373 | 1/1977 | Mori | 303/52 |

Primary Examiner—Trygve M. Blix
Assistant Examiner—Reinhard J. Eisenzopf
Attorney, Agent, or Firm—R. W. McIntire, Jr.

[57] ABSTRACT

The invention relates to an actuating device for pressure medium brake systems for controlling the motor-vehicle brake valve and an electric switching arrangement for continuously switching on the individual braking steps of a third brake system.

4 Claims, 10 Drawing Figures

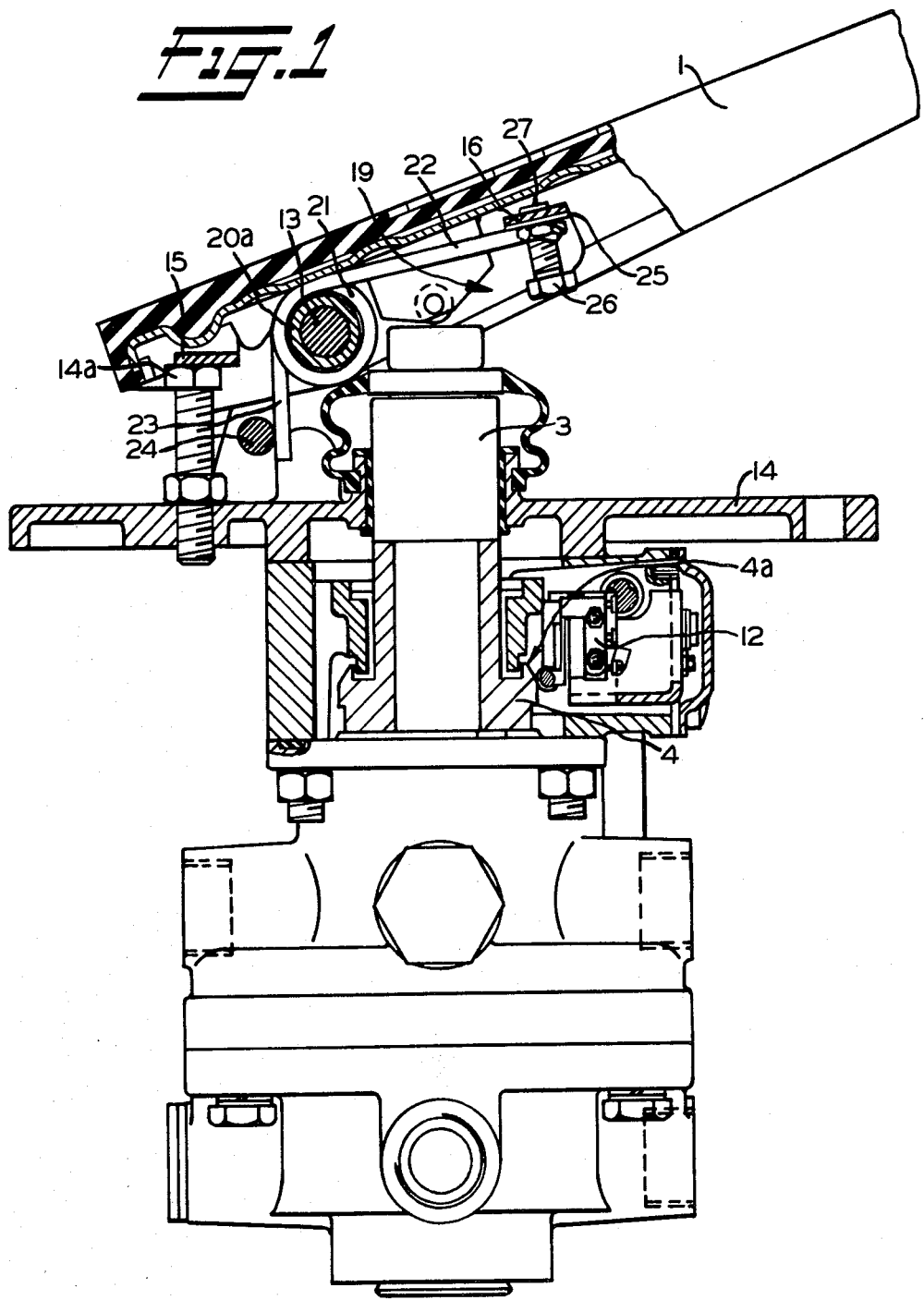

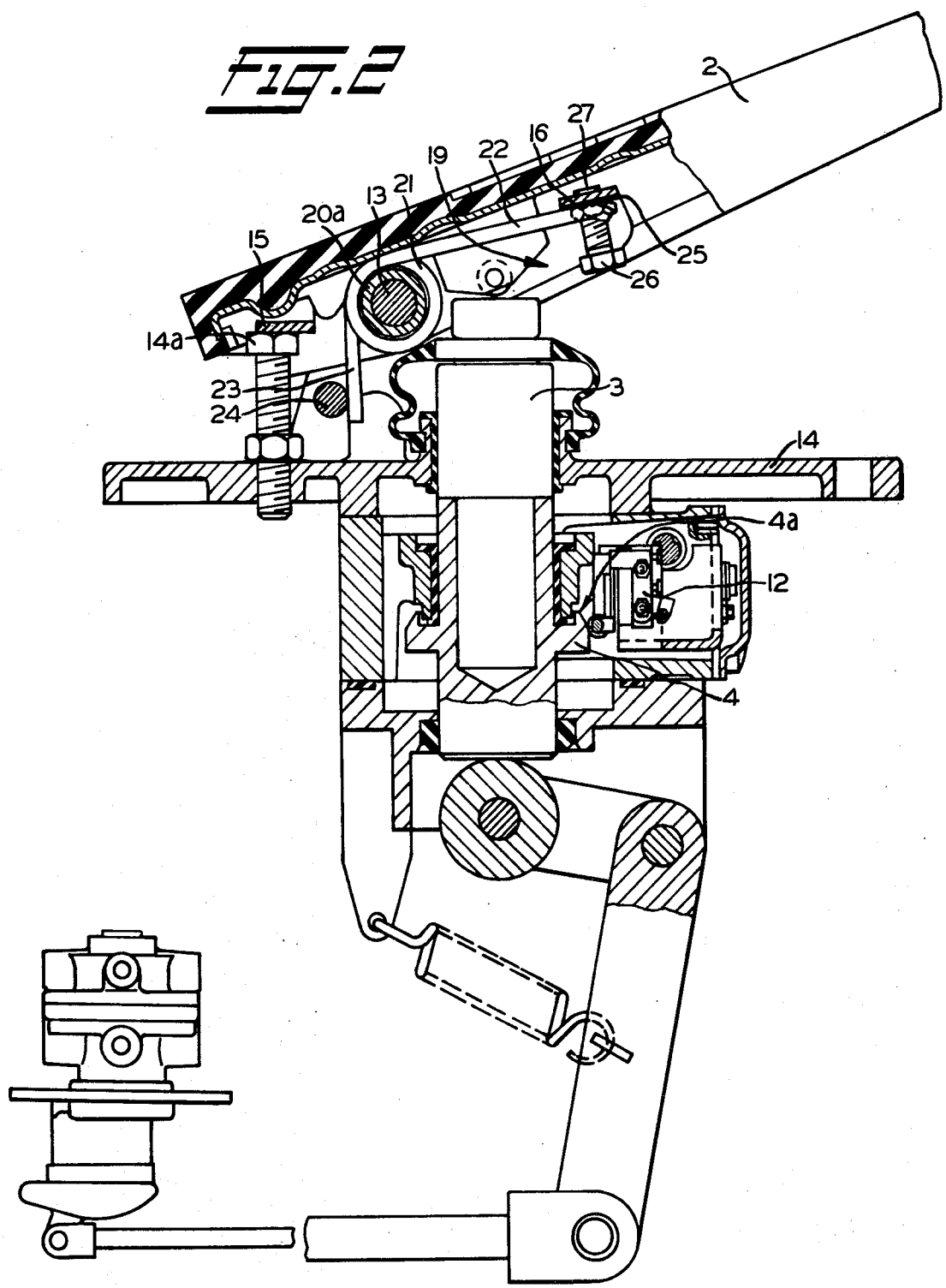

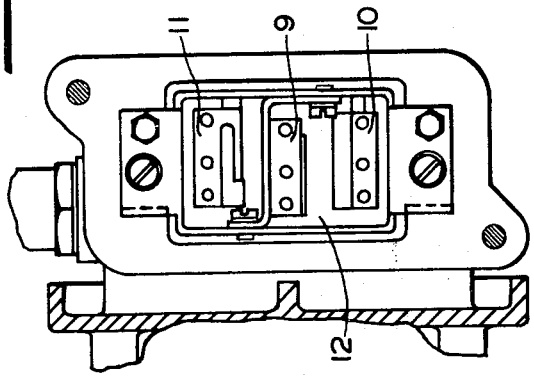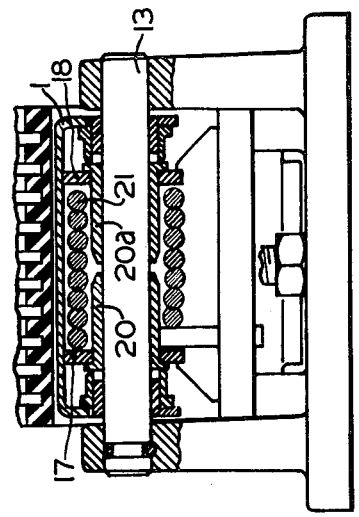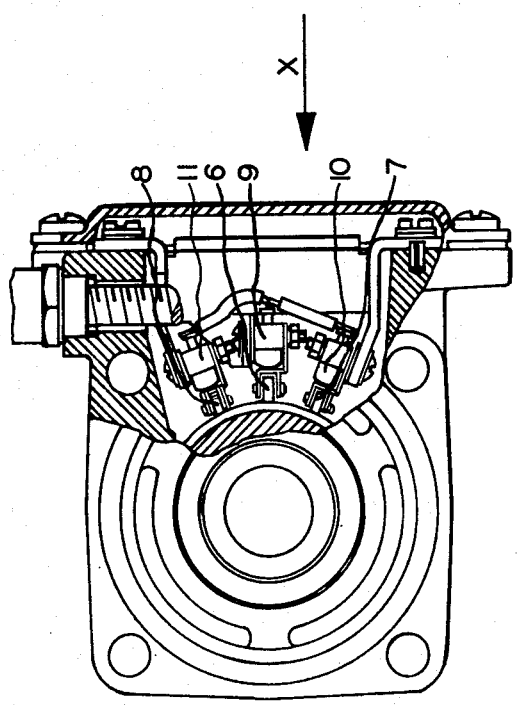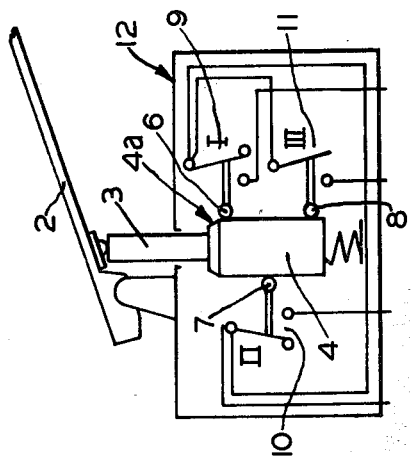

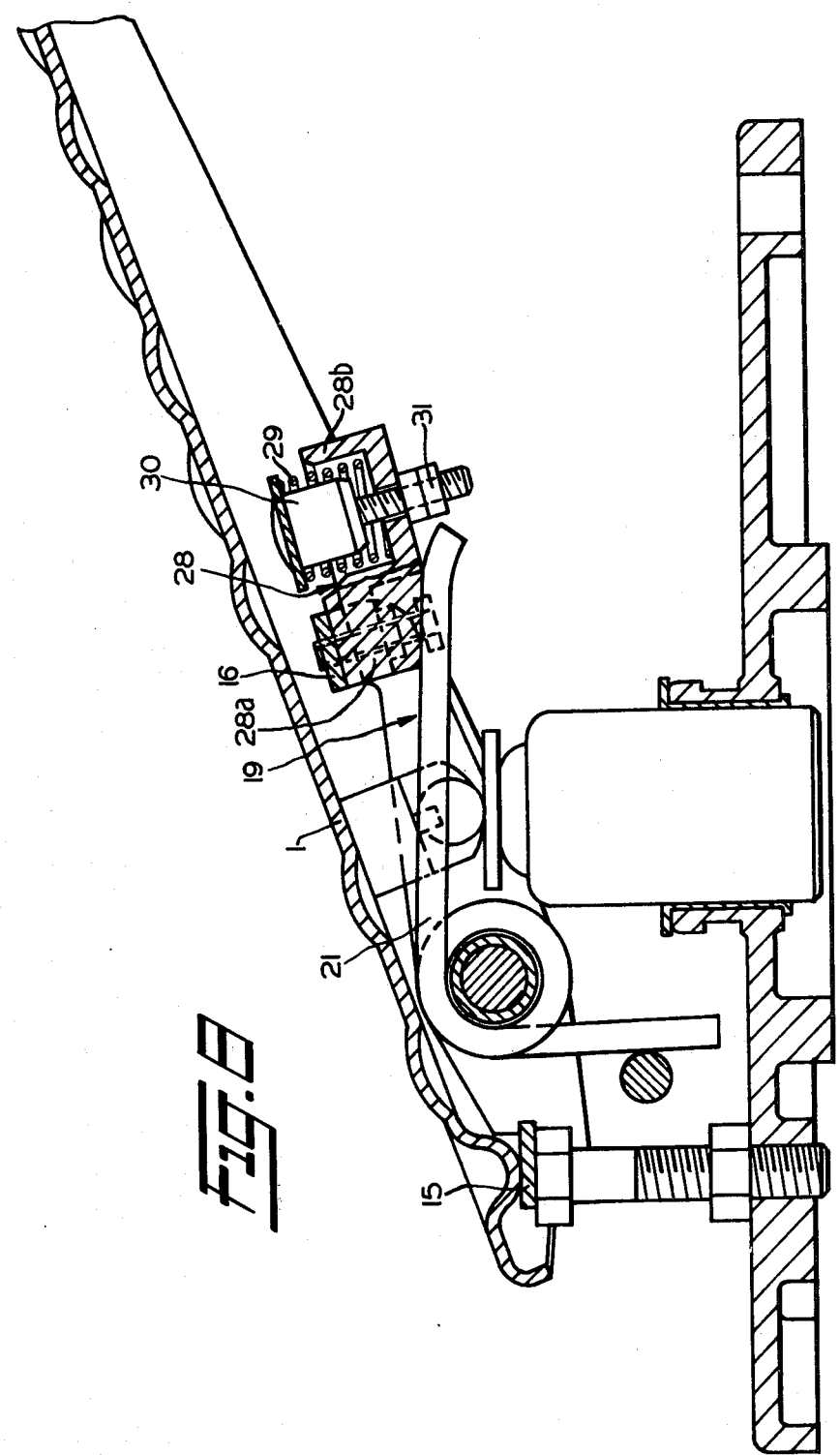

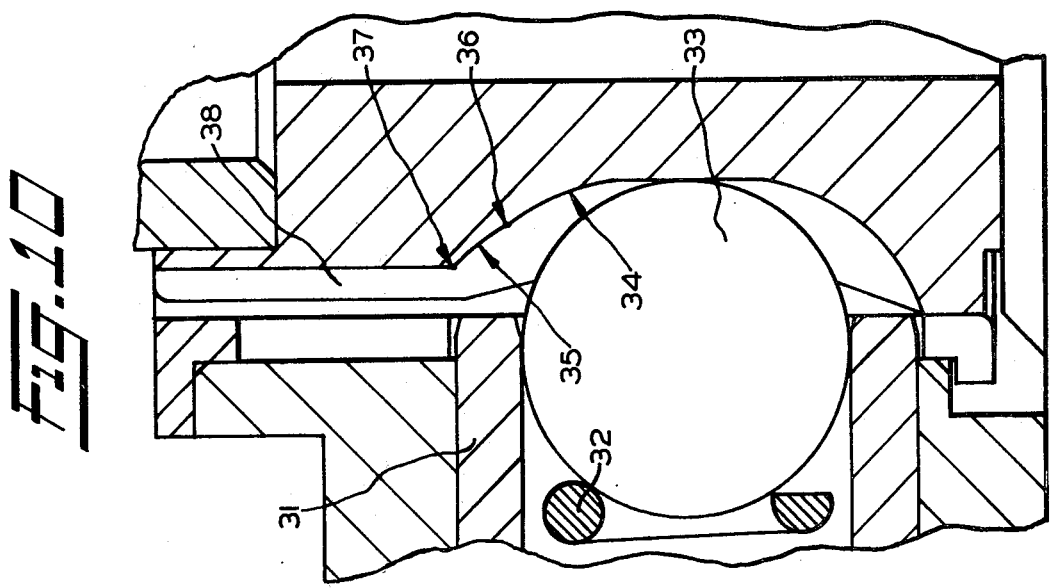
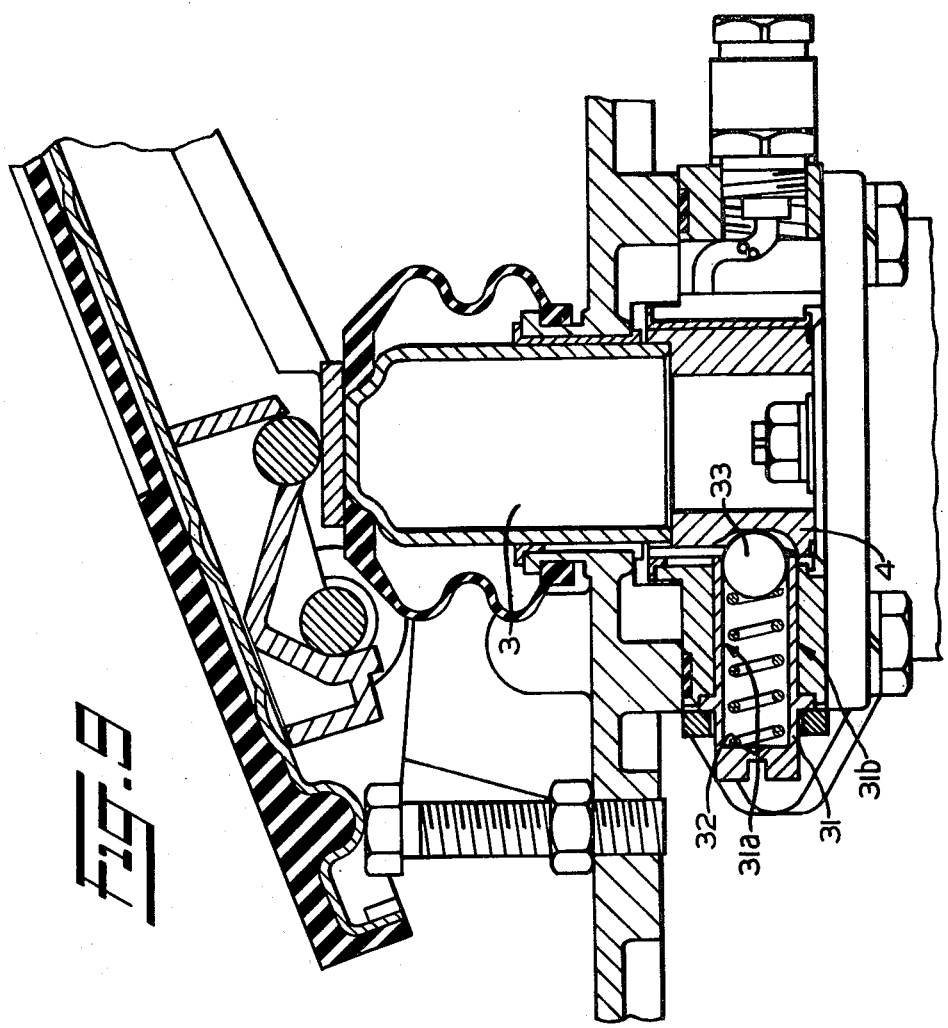

4,161,341

ACTUATING DEVICE FOR PRESSURE MEDIUM BRAKE SYSTEMS

BACKGROUND OF THE INVENTION

The automatic switching-on operation for a third brake when actuating the motor-vehicle brake valve by means of a brake pedal or footplate has been proposed heretofore in that a motor brake is switched on by slightly pushing down the brake pedal in a stepless manner. Air is then supplied, via an air-inlet valve, initially to the operating cylinder of the motor brake and, when pushed further down, also to the operating cylinder of the friction brake, i.e. the service brake.

Furthermore, there are known switching arrangements on motor-vehicle brake valves which switch on the third brake in several braking action steps, in which case, particularly as far as omnibuses are concerned, retarders with three switching steps are used. In the case of the switching arrangements known thus far, these three switching or braking steps are controlled, in vehicles with a pressure medium brake system, by means of electric and pressure-medium operated switches, the first two braking steps of the retarder being as a rule switched on by means of electric switches before activation of the friction brake and the third step being switched on by means of pressure-medium operated switches shortly after activation of the friction brake.

However, the control of the three switching steps of the aforementioned actuating device, or of the three switches by means of the stepped piston of the motor-vehicle brake valve, has some disadvantages which are objected to notably by companies in the transport industry. The rubber element which is usually located between the brake pedal and the stepped piston and which serves as a transmission element, leads—when the braking steps are switched back or off the rubber element, compressed by the pressure on the brake pedal, takes on its original shape as a result of the removal of the pressure—to an undesirable path hysteresis which in the third step is even increased on account of the hysteresis of the pressure medium. It has happened at times that the second step switched back while the third step was still switched on due to the addition of the hysteresis caused by the rubber element and the pressure medium.

A further disadvantage proved to be the fact that the switching operation of the first two steps, which takes place in the free path of the stepped piston, i.e. before admission of pressure mediums, proceeds without any detectable mechanical pressure point, so that undetected switching from the first to the second step produces undesired sharper braking action, which may sometimes have unpleasant consequences for the following traffic and for the passengers standing in the bus.

OBJECT OF THE INVENTION

The object of the invention is to provide an actuating device which controls the motor-vehicle brake valve and the electric switching arrangement for a multistep third brake in such a manner that the braking steps, for instance of a retarder, are automatically switched in sequence and, after switching of the first step, the switching of the next step or steps is indicated by means of a detectable pressure point, and the disengagement of the individual braking steps is not influenced by the connecting elements nor by the hystereses caused by pressure mediums. The first braking steps of the retarder should then become operative before application of the friction brake.

The exemplified embodiment of the invention of the three-step switching arrangement of a retarder is described hereinafter in detail, and in the drawing, in which:

FIG. 1 is a sectional view of an actuating device with a three-step electric switch disposed directly on the motor-vehicle brake valve;

FIG. 2 is a sectional view of an actuating device with a three-step electric switch as a separate unit with the motor-vehicle brake valve connected via a shift lever and rod system;

FIG. 3 is a top view, shown partially in section, of the three-step switch;

FIG. 4 is a side elevational view of the electric step switch as viewed in the direction of FIG. 3;

FIG. 5 is a diagrammatic representation of the three-step electric switch;

FIG. 6 is a sectional view of a first pressure point switching device,

FIG. 8 is a side elevational view of a second pressure point switching device with a strained pressure spring, FIG. 9 is a side elevational view of a third pressure point switching device with ball notches, and FIG. 10 is an enlarged sectional view of a portion of the ball notches of FIG. 9.

Figure 7:
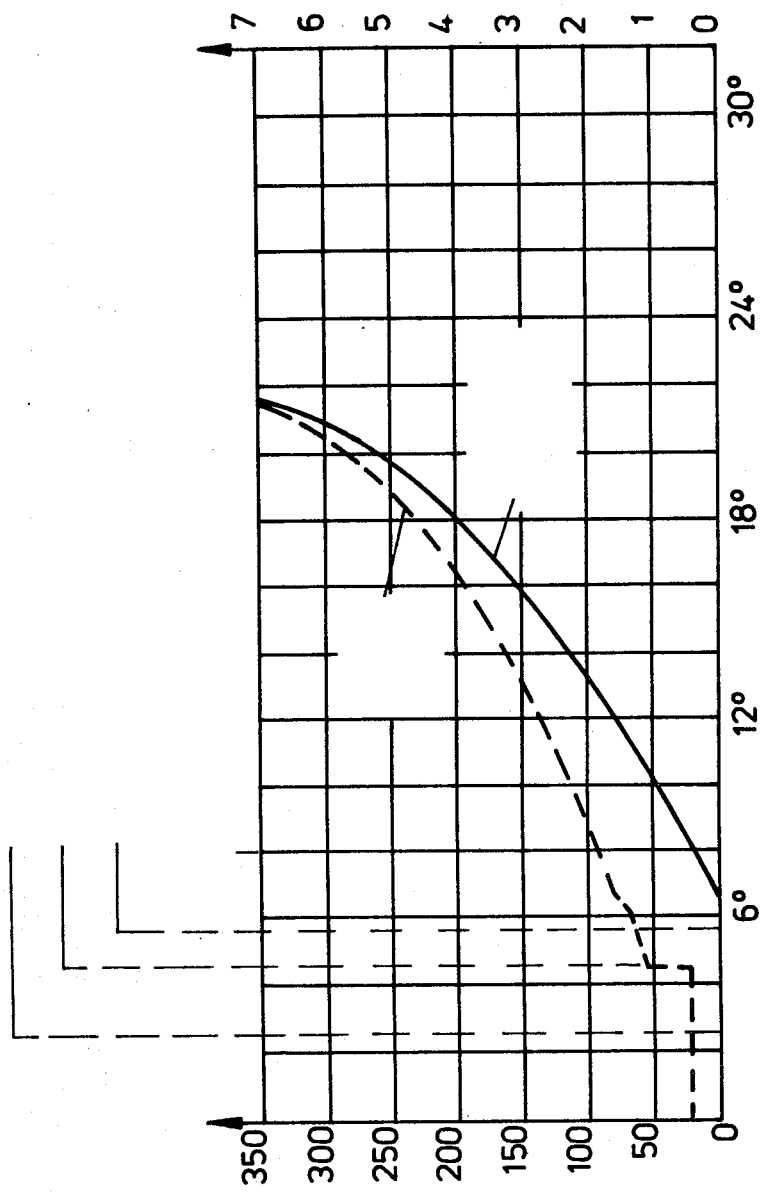
FIG. 7 is a pressure point and switching point diagram as determined by the pedal path and pedal force.

Details of the piston and valve arrangement in the valve housing are not shown with the motor-vehicle brake valve of the two FIGS. 1 and 2, since a description of the operation proper of the motor-vehicle brake valve for actuating a two-circuit service brake system is not necessary for an understanding of the invention which is only concerned with the actuating device of the brake valve.

The actuating device essentially consists of an actuating lever, which in FIG. 1 is in the form of a footplate 1 and in FIG. 2 in the form of a pedal 2, and a push rod 3 whose lower end 4, which is provided with an inclined annular face 4a, forms an operative connection with three switch members 6, 7 and 8 (FIG. 3) of an electric step switch 12 consisting of three switch elements 9, 10 and 11.

The FIGS. 1, 2 and 5 show the actuating device in an unactivated position, i.e. none of the three switching steps I, II and III (FIG. 5) of the electric step switch 12 are switched on.

The switch elements 9, 10 and 11 are vertically adjustable, so that the individual switching steps I, II and III shown in FIG. 5 can be set according to the operating or braking conditions of the vehicle.

In order to create a detectable pressure point before switching on the second retarder braking step, between the flanges of the actuating lever 1, 2 which in relation to the supporting plate 14 is pivotally supported on the bolt 13, there is provided on the bushings 20 and 20a of the bolt 13 an auxiliary actuating lever or swiveling device 19, likewise pivotally supported, in the form of a swinging frame consisting of two cross pieces 15 and 16 and two side plates 17 and 18 (FIG. 6). The rotary motion is limited by a vertically adjustable stop 14a mounted on the supporting plate 14. A torsion spring 21 which is disposed between the side plates 17 and 18 and centered by means of the bushings 20 and 20a, and whose long leg 22 lies against the upper cross piece 16 and whose shorter end 23 lies against a stop pin 24, is tensioned by the swiveling device 19. The tensioning force of this torsion spring 21 can be adjusted by inserting disk plates 25 between the upper cross piece 16 and the long spring leg 22.

In the following description of the operation of the actuating device of the motor-vehicle brake valve shown in the FIGS. 1, 2 and 5 which form part of the description, reference is made to the diagram of FIG. 7 to provide a better understanding of the function of the three-step switching arrangement for switching the retarder.

OPERATION

When the actuating lever 1, 2 is pushed down, the push rod 3, 4 moves downwards and the switch member 6 of the switch element 9 follows, under the influence of the spring tension, the inclined annular face 4a; the retarder switching step I is switched on. When it is pushed further down, the actuating lever 1, 2 meets a stop 27, which is vertically adjustable by means of a screw 26 and disposed on the swiveling device 19, so that after a detectable pressure point the footplate 1 or the pedal 2 takes along the swiveling device 19 against the constant force of the spring 21. Only after this pressure point, the switch member 7 of the switch element 10 switches on the retarder switching step II, in accordance with the diagram in FIG. 7.

Now, when pushing down further, the function proper of the motor-vehicle brake valve becomes operative, i.e. air is supplied to the friction brake or service brake system and only thereafter the switch element 11 switches on the switching step III, as is apparent from the diagram of FIG. 7.

FIG. 8 shows a possible solution, when a second pressure point between the switching step II and the switching step III is desired. In this case, an additional pressure point device 28 is mounted to the upper cross piece 16 of the swiveling device 19, while the choice of the strength of the fastening flange 28a of this pressure point device 28 makes it possible to determine at the same time the strength of the tensioning force of the spring 21. Inserted in the cup-shaped structure 28b of this device 28 there is a strained pressure spring 29 whose upper end carries a contact piece 30. The initial tension of the spring 29 as well as the position of the contact piece 30 can be adjusted by means of a screw 31.

The operation of this double pressure point device is as follows:

When the actuating lever 1, 2 is pushed down, the switching step I is switched on before the footplate 1 or the pedal 2 touches the contact piece 30. Overcoming the tension of the spring 29 makes the first pressure point detectable. When the footplate 1 or pedal 2—and as a result the contact piece 30—is pushed further down against the force of the spring 29, the switching step II is switched on. It is important in this connection that the initial tension of the spring 21, as compared with the spring 29, is greater to an extent such that the device 19 moves along downwards with the footplate 1 or pedal 2 only when it forms an operative connection with cross piece 16—which serves as a stop—of the device 19, and when the foot pressure on the footplate or pedal overcomes the tension of said spring 21, whereby at the same time the second pressure point becomes detectable. After overcoming the second pressure point and when moving further downwards against the force of the spring 21, the step III of the retarder is switched on after first air has been supplied to the service brake system as a result of the normal operation of the brake valve.

FIG. 9 shows a further development of a pressure point device which may be provided with either one or two or also more pressure points. It consists of a housing 31 fixed to the actuating device, a tensioned pressure spring 32 located in this housing 31, and a ball 33 pressed against the push rod 3, 4 by the pressure spring 32.

As is shown on an enlarged scale in FIG. 10, the push rod 3, 4 is provided with two radii 34, 35 as well as a guide groove 38.

When the footplate 1 or the pedal 2 is pushed down, then, as a result of the simultaneous downward movement of the push rod 3, 4, the ball 33 is first pushed into the radius 34 by the tension of the spring 32. In this range of the movement, the braking step I of the retarder is switched on. A perceptible first pressure point arises when the ball 33 is forced over the point of intersection 36 of the two radii 34 and 35 when the push rod 3, 4 moves further downwards, to be subsequently pushed into the second radius 35 by the tension of the spring 32, at which point the switching step II is switched on. The second pressure point becomes perceptible before switching on step III, when the ball 33 passes over the point of intersection 37 which the radius 35 forms together with the groove 38.

The position of the pressure points is adjustable here as well, by turning the housing 31, which, as a result of the eccentric configuration of the bore 31a in the housing 31 relative to the outer diameter 31b, causes the ball 33 to be moved upwards and downwards.

Having now described the invention, what we claim as new and desire to secure by Letters Patent, is:

1. An actuating device for controlling the operation of vehicle brake systems, comprising:
   (a) a support;
   (b) an actuating lever pivotally attached to said support;
   (c) a push rod disposed on said support for axial movement relative thereto;
   (d) means on said actuating lever engageable with said push rod to axially move said push rod in a first direction by an amount dependent upon the amount of pivotal movement of said actuating lever in said first direction;
   (e) means axially biasing said push rod in a second direction opposite said first direction;
   (f) an auxiliary actuating lever pivotally attached to said support and underlying said actuating lever so that pivotal movement of said actuating lever in said one direction effects engagement of said actuating lever with said auxiliary actuating lever;
   (g) means biasing said auxiliary actuating lever around said pivot in said second direction;
   (h) first stop means on said support engageable by said auxiliary actuating lever to limit pivotal movement of said auxiliary actuating lever in said second direction;
   (i) second stop means on said support engageable by said actuating lever to limit pivotal movement of said actuating lever in said second direction and so disposed as to provide a predetermined distance for movement of said actuating lever away from said second stop means in said first direction before engagement with said auxiliary actuating lever, and means on said push rod for actuating braking mechanism in accordance with the axial position of said push rod.

2. An actuating device for controlling the operation of vehicle brake systems, as recited in claim 1, in which said actuating lever and said auxiliary actuating lever are pivotally attached to a common pivot member attached to said support.

3. An actuating device for controlling the operation of vehicle brake systems, as recited in claim 1, further including:

(a) a cup-shaped element attached to one of said actuating lever and said auxiliary actuating lever and extending into said space therebetween;

(b) a contact element disposed in said cup-shaped element and spring biased in a direction out of said cup-shaped element toward the other of said actuating member and said auxiliary actuating member, and, (c) means establishing a limit of movement of said contact element out of said cup-shaped element to provide a space between said contact element and said other one of said actuating lever and said auxiliary actuating lever when said actuating lever and said auxiliary actuating lever are engaged with said second stop means and said first stop means, respectively.

4. An actuating device for controlling the operation of vehicle brakes, comprising:

(a) actuating lever means attached to a support for pivotal movement relative thereto;

(b) said support having a cylindrical cavity therein;

(c) a push rod disposed for axial movement in said cavity in a first direction responsive to pivotal movement of said actuating lever in said first direction;

(d) means axially biasing said push rod in a second direction opposite said first direction;

(e) stop means on said support for limiting movement of said actuating lever in said second direction;

(f) a ball member mounting in a cylindrical housing on said support and spring biased against the surface of said push rod in a direction perpendicular to the axis of said push rod;

(g) a cavity in the surface of said push rod engaged by said ball when said push rod is disposed at the limit position as determined by engagement of said actuating lever with said stop means; and (h) said cavity having a surface comprised of at least a first and second contiguous intersecting surface portions each generated on a different radius of curvature forming a ridge at the intersection thereof, and so disposed relative to each other that, upon movement of said push rod, a first and second predetermined amount in said first direction from said limit position said ball is engaged in said first and said second surface portions, respectively.

* * * * *